United States Patent

Aihara

[11] Patent Number: 5,574,971
[45] Date of Patent: Nov. 12, 1996

[54] MOBILE COMMUNICATION METHOD AND SYSTEM FOR OPTIMAL SELECTION OF RADIO ZONE

[75] Inventor: Makoto Aihara, Tokyo, Japan

[73] Assignee: NEC Corporation, Tokyo, Japan

[21] Appl. No.: 411,312

[22] Filed: Mar. 28, 1995

[30] Foreign Application Priority Data

Mar. 28, 1994 [JP] Japan .................................. 6-056934

[51] Int. Cl.$^6$ ...................................................... H04B 7/26
[52] U.S. Cl. ........................ 455/33.1; 455/54.1; 455/56.1
[58] Field of Search ................................. 455/33.1, 33.2, 455/33.4, 53.1, 54, 54.2, 56.1, 62; 379/59, 60

[56] References Cited

U.S. PATENT DOCUMENTS

| | | | |
|---|---|---|---|
| 5,278,991 | 1/1994 | Ramsdale et al. | 455/56.1 |
| 5,381,443 | 1/1995 | Borth et al. | 455/33.4 |

FOREIGN PATENT DOCUMENTS

| | | | |
|---|---|---|---|
| 3131131 | 10/1989 | Japan | 455/33.1 |
| 2-244917 | 9/1990 | Japan . | |
| 3196722 | 8/1991 | Japan | 455/33.4 |

Primary Examiner—Reinhard J. Eisenzopf
Assistant Examiner—Thanh Le
Attorney, Agent, or Firm—Foley & Lardner

[57] ABSTRACT

A mobile communication system is divided into a plurality of large zones, with each large zone being served by a large service area base station. The large zone is further divided into a plurality of small zones, each served by a respective one of a plurality of small service area base stations. Each base station broadcasts an identification signal for indicating a type of base station (i.e., large zone or small zone), and other necessary information relating to communication for notifying to the mobile terminal. The mobile terminal selects an optimum base station depending on certain conditions, such as the moving speed of the mobile terminal, the large zone or small zone where the mobile terminal being located, the signal receiving state from the base station currently communicating with the mobile terminal, and availability of the large zone or a small zone to be changed over by measuring signals received from other base stations.

6 Claims, 5 Drawing Sheets

MOBILE COMMUNICATION METHOD AND SYSTEM FOR OPTIMAL SELECTION OF RADIO ZONE

BACKGROUND OF THE INVENTION

1. Field of the Invention

The present invention relates to a mobile communication method and a mobile communication system wherein each of a plurality of large service area base stations covers one of a plurality of large zones into which the service area is divided, each of a plurality of small service area base stations covers one of a plurality of small zones into which each large zone is divided, and the radio channel switching for mobile terminals used in the service areas of these large area or small area base stations is controlled by a mobile switching center.

2. Description of the Related Art

In a conventional mobile communication system typically of the cellular type, the radio zone to be covered by each base station is made a small size for increasing the capacity of subscribers through improvement of the efficiency of frequency utilization, i.e. the same frequency can be used in some other zones in which the same frequency does not interfere each other. However, this involves the disadvantage that the smaller the radio zones, and the faster, the mobile terminal moves, the more frequent the shift of the mobile terminal from one radio zone to another, resulting in such deterioration of service quality based on increased momentary interruption or more lasting interruption of communication due to channel switching.

To overcome this disadvantage, there has been invented a method by which each service area is divided into a plurality of large zones, each of which is further divided into a plurality of small zones, and the use of the large and small zones is differentiated according to the moving speed of the mobile terminal (see the Japanese Patent Laid-Open Gazette No. 1990-244917). FIG. 6 is a flow chart showing how this type of radio zone selecting system operates. Thus, the radio zone to be used by the mobile terminal, when the quality of communication deteriorates at the time of originating a call, terminating a call or during communication, is determined according to a table provided at the mobile switching center for determination of the radio zone to be used correspondingly to the moving speed and according to moving speed information collected from the mobile terminal.

According to the conventional radio zone selection method described above, because the mobile switching center selects the radio zone, the expansion of the subscriber capacity by decreasing the size of each radio zone may be restricted by the processing capacity of the mobile switching center. Moreover, since the radio channel is not switched until the quality of communication deteriorates even if the moving speed varies during communication, if the moving speed varies from low to high during communication, the subsequent channel switching may prove faulty.

An object of the present invention, with an eye to solving these problems, is to alleviate the drop in the processing capacity of the mobile switching center and the deterioration of service quality due to decreasing the size of radio zones by having the mobile terminal take the initiative in selecting the radio zone and switching the channel during communication by selecting the radio zone according to its moving speed.

SUMMARY OF THE INVENTION

According to the invention, there is provided a mobile communication method by which each of a plurality of large service area base stations covers one of large zones into which the service area is divided, each of a plurality of small service area base stations covers one of a plurality of small zones into which each large zone is divided, and the switching of the radio channel on which a mobile terminal receives the service of a large area or small area base station is controlled by a mobile switching center, wherein:

each of large area and small area base stations sends out a radio signal indicating its radio zone; and said mobile terminal is enabled to identify the radio zone of each of said large area and small area base stations, selects, when originating or terminating a call, the optimal radio zone according to its moving speed out of the radio zones of the pluralities of large area and small area base stations covering the area in which it is moving, selects during communication the optimal radio zone according to its moving speed out of the radio zones of the pluralities of large area and small area base stations covering the area in which it is moving, and requests a mobile switching center via the large area or small area base station through which it is communicating to switch the radio channel to the large area or small area base station serving the selected optimal radio zone as the destination of switching.

Selection of said optimal radio zone should desirably be preferential selection of a large area base station serving a large zone if the moving speed of the mobile terminal is not below a certain standard level, or of a small area base station serving a small zone if the moving speed of the mobile terminal is below the standard level.

According to the invention, there is provided a mobile communication system having a plurality of large service area base stations each covering one of large zones into which the service area is divided, a plurality of small service area base stations each covering one of a plurality of small zones into which each large zone is divided, and mobile switching centers for controlling the switching of the radio channel on which a mobile terminal receives the service of a large area or small area base station, wherein:

each of said large area and small area base stations has base station identification signal sending means for sending out a radio signal indicating its radio zone, said mobile terminal has zone identification means for identifying the radio zones of said large area and small area base stations; first zone selector means for selecting, when originating or terminating a call, the optimal radio zone according to the moving speed of the mobile terminal out of the radio zones of the pluralities of large area and small area base stations covering the area in which the mobile terminal is moving; second zone selector means for selecting during communication the optimal radio zone according to the moving speed of the mobile terminal out of the radio zones of the pluralities of large area and small area base stations covering the area in which the mobile terminal is moving; and switching requester means for requesting a mobile switching center via the large area or small area base station through which the mobile terminal is communicating to switch the radio channel to the large area or small area base station serving the optimal radio zone selected by the first or second zone selector means as the destination of switching.

It is desirable for the first and second zone selector means, in order to select the optimal radio zone, to preferentially select a large area base station serving a large zone if the moving speed of the mobile terminal is not below a certain standard level, or a small area base station serving a small zone if the moving speed of the mobile terminal is below the standard level.

The present invention, by enabling the mobile terminal to select a radio zone appropriate for its moving speed, makes it possible to select, when originating or terminating a call, a large zone when the moving speed is high or a small zone when the moving speed is low or, during communication, a large zone when the moving speed changes from low to high, or a small zone when the speed changes from high to low, and thereby to use for communication a radio zone corresponding to the moving speed all the time.

BRIEF DESCRIPTION OF THE DRAWINGS

The present invention will be described in further detail below with reference to the accompanying drawings, in which.

DETAILED DESCRIPTION OF THE PREFERRED EMBODIMENT

Figure 1:
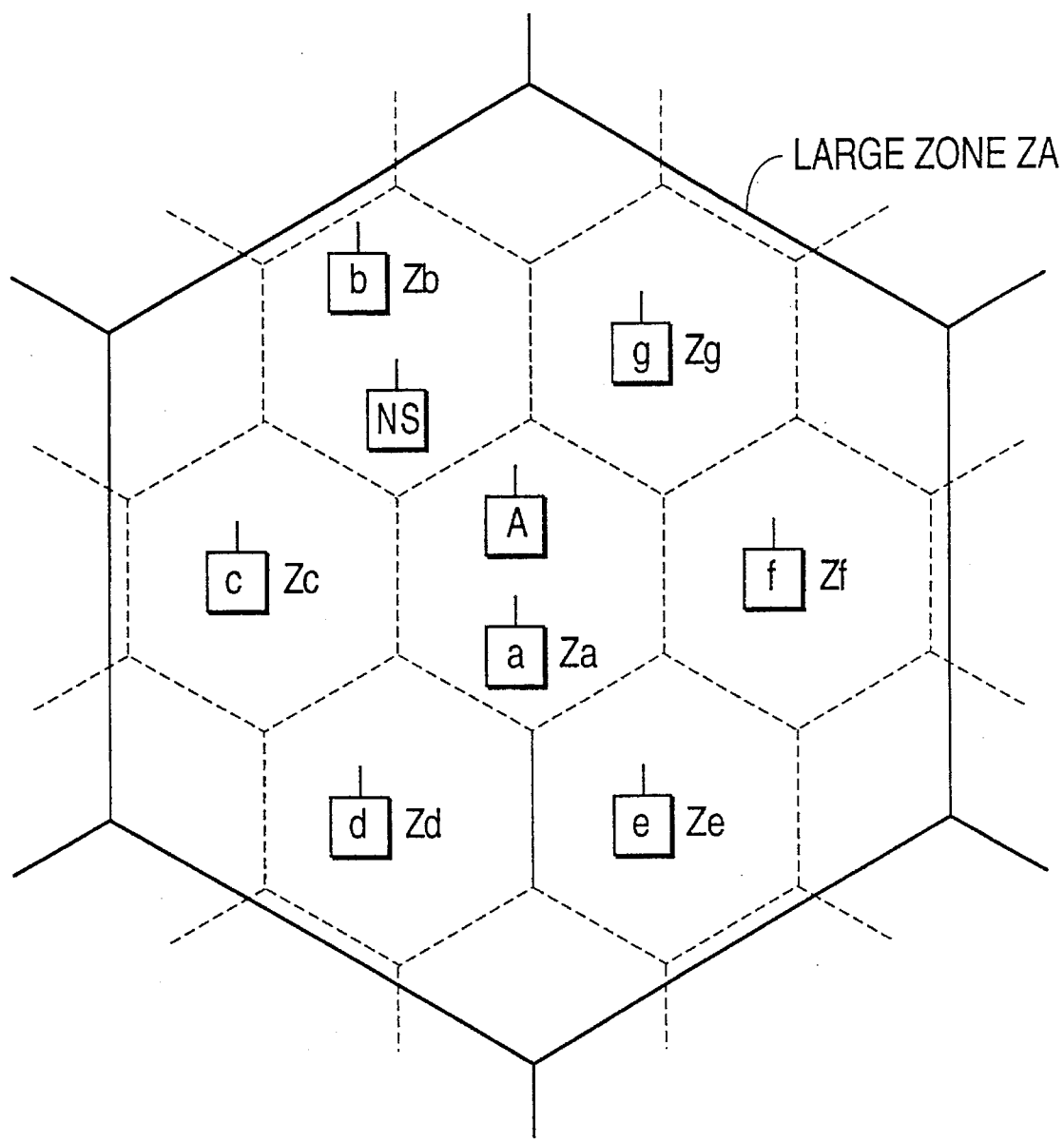
FIG. 1 is a diagram illustrating the configuration of a service area to which one preferred embodiment of the mobile communication method for optimal selection of the radio zone according to the invention is applicable.
Figure 2:
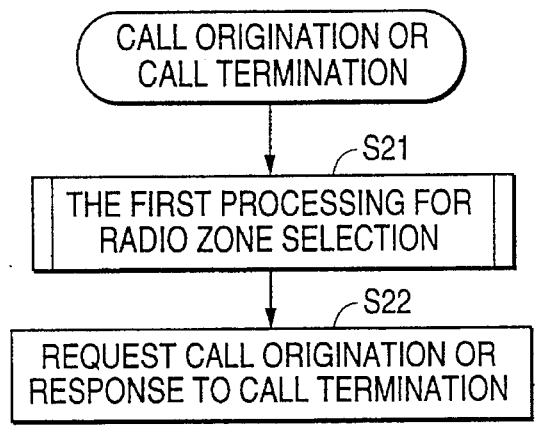
FIG. 2 is a flow chart showing the operation of this embodiment when originating or terminating a call to or from the service area of FIG. 1.
Figure 3:
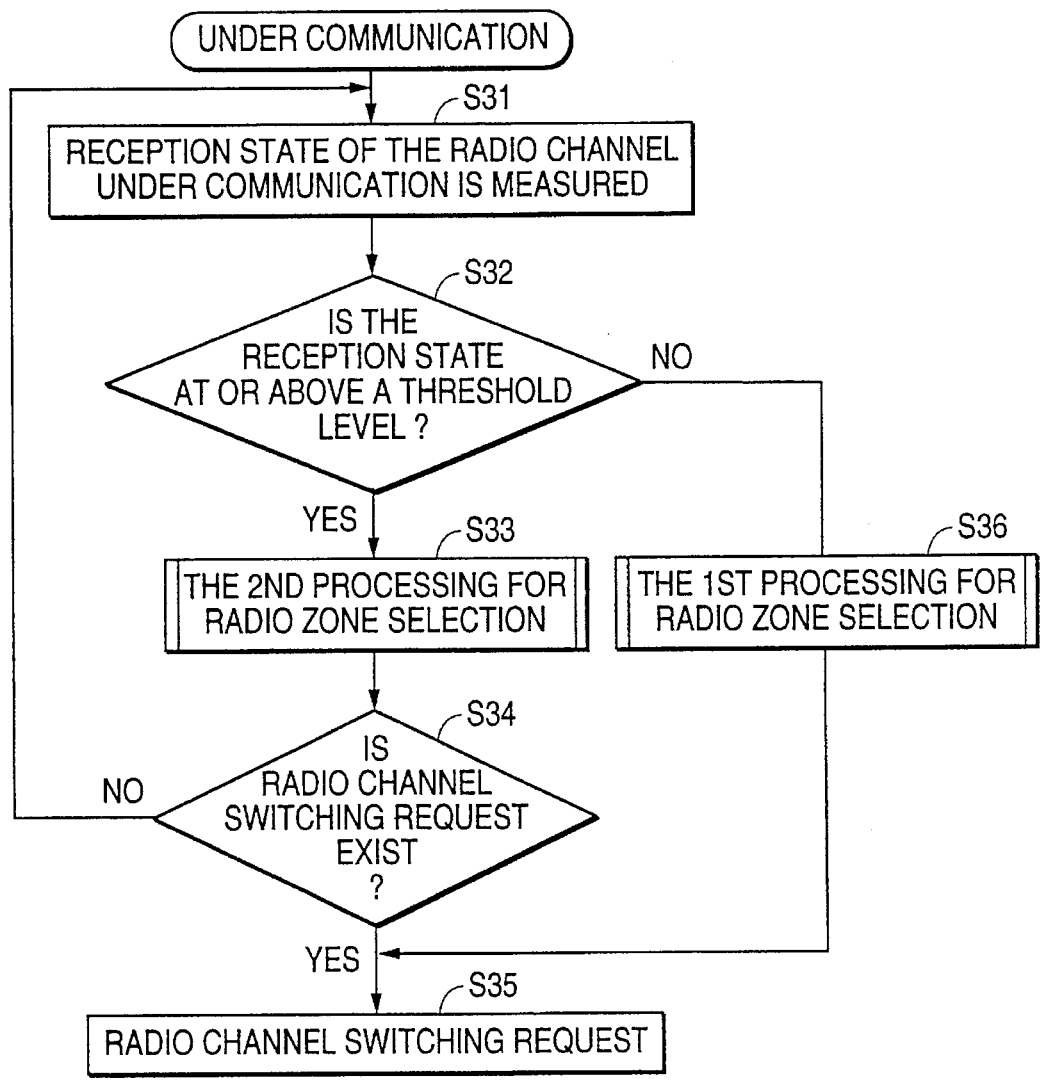
FIG. 3 is a flow chart showing the operation of this embodiment during communication with the service area of FIG. 1.
Figure 4:
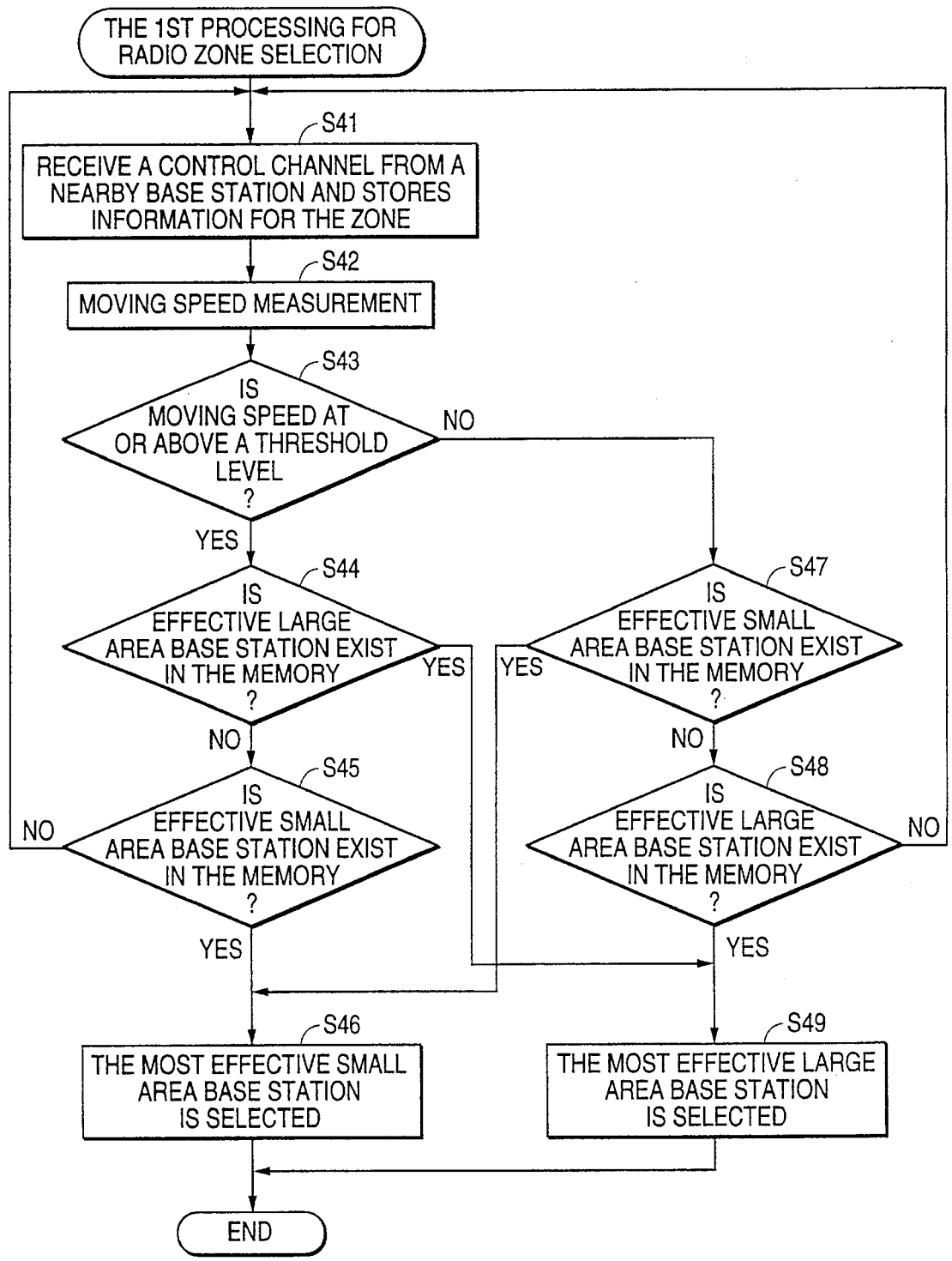
FIG. 4 is a flow chart showing the first processing for radio zone selection in FIG. 3.
Figure 5:
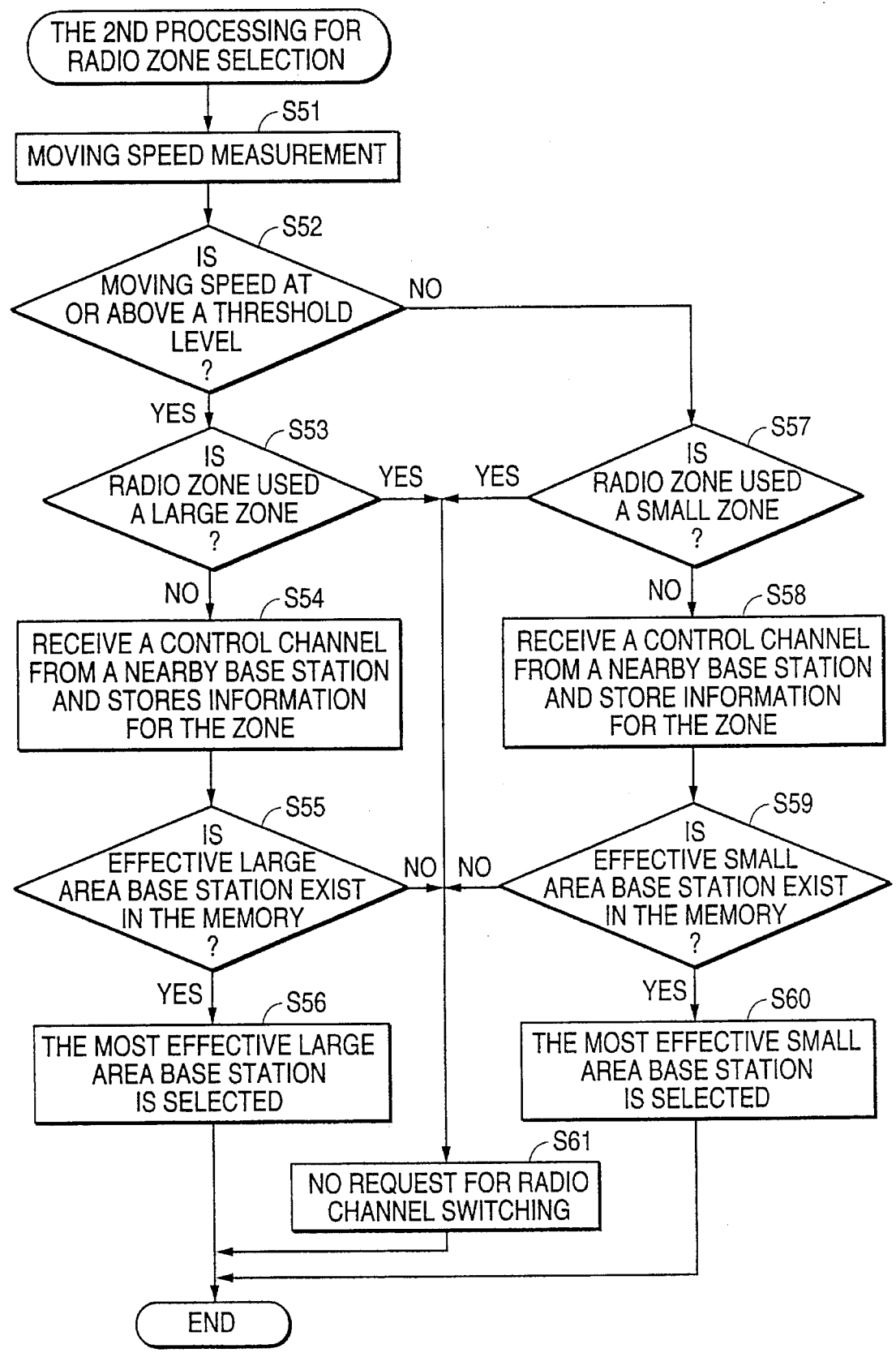
FIG. 5 is a flow chart showing the second processing for radio zone selection in FIG. 3.
Figure 6:
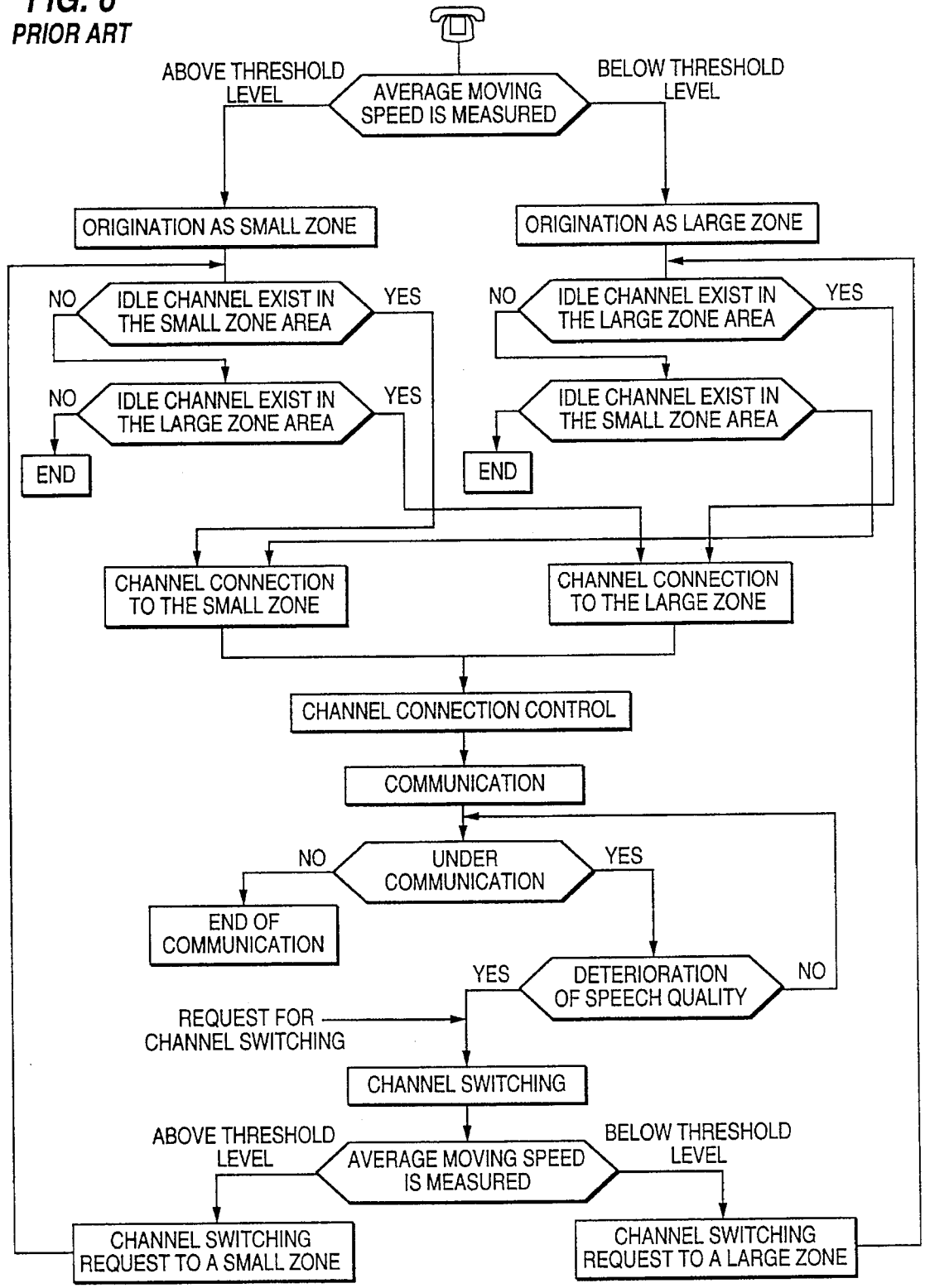
FIG. 6 is a flow chart showing how a radio zone selection method according to the prior art operates.

Next will be described a preferred embodiment of the present invention with reference to drawings. FIG. 1 is a diagram illustrating the configuration of a service area to which the embodiment of the mobile communication method for optimal selection of the radio zone according to the invention is applicable; FIG. 2 is a flow chart showing the operation of this embodiment when originating or terminating a call; FIG. 3 is a flow chart showing the operation of this embodiment during communication; FIG. 4 is a flow chart showing the first processing for radio zone selection in FIG. 3; and FIG. 5 is a flow chart showing the second processing for radio zone selection in FIG. 3.

The service area to which this embodiment is applicable is divided into a plurality of large zones, each of which is further divided into a plurality of small zones. It has to be noted that, in FIG. 1, only one large zone ZA (whose boundary is indicated by solid lanes) and a plurality of small zones Za, Zb, Zc, Zd, Ze, Zf and Zg (whose boundaries are indicated by dotted lines) belonging to the large zone ZA are illustrated with a view to ready understanding, but the depiction of adjoining large and small zones is dispensed with. The large zone ZA is covered by a large area radio base station A, while the small zones Za, Zb, Zc, Zd, Ze, Zf and Zg are respectively covered by small area radio base stations a, b, c, d, e, f and g.

Next will be described the operation of the radio zone selection method embodied hereby with reference to FIGS. 2 through 5. As shown in FIG. 2, in originating or terminating a call, the first processing for radio zone selection is accomplished (step S21) to request call origination or respond to terminating call (step S22). The first processing for radio zone selection of step S21 will now be described with reference to FIG. 4, in which it is shown in detail.

As illustrated in FIG. 4, a mobile terminal MS receives a control channel from a nearby base station, and stores the channel number, the type of the radio zone, the reception level, congestion information and so forth (step S41). The radio zone can conceivably be identified, for instance, by adding the type of the radio zone to the downlink (from a base station to a mobile terminal) control channel or by distinguishing the radio zone by the reference number of the control channel. The mobile terminal MS then determines the moving speed (step S42). The moving speed can conceivably be determined, for instance, by measuring the level change or reception from the base station, fading pitch or the like and converting the measurement into the moving speed or directly measuring it with a speedometer.

Next it is judged whether or not the measured moving speed is at or above a certain standard level (step S43). If it is found at or above the standard level, it is judged whether or not any effective large area base station is found among the base stations memorized at step S41 (step S44). If no effective large area base station is found, it is judged whether or not there is an effective one among small area base stations (step S45), and if none is found, the processing returns to step S41. If, instead, any effective one or ones are found among the small area base stations, the most effective one among them is selected (step S46).

If, at step S43, the moving speed is found to be below the standard level, it is judged whether or not there is any effective small area base station among the base stations memorized at step S41 (step S47); if there is, the processing goes ahead to step S46 or, if there is none, it is judged whether or not there is any effective large area base station (Step S48). If any effective large area effective large area base station or stations are found, the most effective one among them is selected (step S49). Or if it is judged at step S44 that there is any effective large area base station, the processing will move on to step S49.

As a specific example, description will now be made of a case in which base stations a, b, c and A are memorized at step S41. If, at step 43, the moving speed of the mobile terminal MS is found to be at or above the standard level and if base station A is effective, it is selected through steps S44 and S49. Or if, at step 43, the moving speed of the mobile terminal MS is found to be below the standard level, the most effective one among base stations a, b and c is selected.

Next will be described, with reference to FIGS. 1, 3, 4 and 5, the processing for radio zone selection when the mobile terminal MS is engaged in communication. As shown in FIG. 3, the mobile terminal MS determines the reception state of the radio channel on which communication is taking place (step S31). It is judged according to the determined result whether or not the reception state is at or above the standard level (step S32).

If it is judged that the reception state has become unable to satisfy the standard level on account of a deterioration of the reception level or the like, the first processing for radio zone selection according to the flow chart of FIG. 4 is performed as in the case of originating or terminating a call (step S36). As base station information to indicate the destination to which the base station determined by the processing of step S36 is to be switched, switching of the radio channel is requested via the base station now involved in the communication. As base station information to indicate the destination of switching, conceivably the reference number of the control channel may be used, or the base station number may be added to the downlink control channel.

If, at step S32, the reception state of the radio channel involved in the communication is judged to be at or above the standard level, the second processing for radio zone selection according to the flow chart of FIG. 5 is performed (step S33). Now will be described the second processing for radio zone selection with reference to FIG. 5.

First, the moving speed of the mobile terminal MS is measured (step S51), and it is judged whether or not the speed is at or above the standard level (step S52). If it is judged in the affirmative, it is then judged whether or not the radio zone used for the communication is a large zone (step S53). If it is a large zone, no request for radio channel switching is made (step S61) because such switching is unnecessary, and the radio channel on which the communication is taking place remains in use. If, at step S53, the radio zone used for the communication is judged to be a small zone, control channels from nearby base stations are received, and the channel number, the type of the radio zone, congestion information and so forth of each are memorized (step S54). It is judged whether or not there is anything referring to a base station of an effective large zone in the memorized information (step S55); if there is nothing referring to a large area base station, the processing moves on to step S61 or, if there is any such large zone base station or stations, the most effective among them is selected (step S56).

If, at step S52, it is judged that the moving speed of the mobile terminal MS is below the standard level, it is judged whether or not the radio zone used for the communication is a small zone (step S57). If it is judged in the affirmative, the processing moves on to step S61 without making a request for radio channel switchings, and the radio channel on which the communication is taking place remains in use. If, at step S57, the radio zone used for the communication is judged not to be a small zone, control channels from nearby base stations are received, and the channel number, the type of the radio zone, congestion information and so forth of each are memorized (step S58). It is judged whether or not there is anything referring to a base station of an effective small zone in the memorized information (step S59); if there is nothing referring to a small area base station, the processing moves on to step S61 or, if there is any such small zone base station or stations, the most effective among them is selected (step S60).

As a specific example, description will now be made of a case in which base stations a, b, c and A, among the base stations memorized at step S54, are judged to be effective, a request for radio channel switching to the base station information of the base station A as destination is made at step S56 via the base station now involved in the communication because the base station A is the only large area base station among them. Incidentally, if the reception level of the base station A is below the standard level or the base station A is congested, it is judged at step S55 that there is no effective base station among the large area stations, and the processing will move on to step S61 to continue to use the radio channel currently involved in the communication without making a request for channel switching.

Thus, by having the mobile terminal select the radio zone appropriate for its moving speed out of a plurality of base stations covering the area in which the mobile terminal is moving, it is made possible to alleviate the drop in the processing capacity of the mobile switching center due to decreasing the size of radio zones and the deterioration of service quality ensuing from the switching of the channel currently used for the communication.

As hitherto described, the present invention has the effect to improve the efficiency of frequency utilization without sacrificing the quality of service because it can alleviate the drop in the processing capacity of the mobile switching center due to decreasing the size of radio zones and the deterioration of service quality by enabling the mobile terminal to select a radio zone appropriate for its moving speed and thereby to use for communication a radio zone corresponding to its moving speed all the time.

Although the invention has been fully described by way of a specific embodiment thereof with reference to the accompanying drawings, various changes and modifications will be apparent to persons skilled in the art. Therefore, unless these changes and modifications otherwise depart from the scope of the invention, they should be construed as included therein.

What is claimed is:

1. A mobile communication system including a mobile terminal operating within a large zone being served by a large service area base station, said large zone being divided into a plurality of small zones each being respectively served by a small service area base station, said system comprising:

identification signal output means, provided in said large service area base station and each of said small service area base stations, for outputting an identification signal identifying a transmitting base station as one of said large service area base station and said small service area base station;

receiving means, provided in said mobile terminal, for receiving, as received identification signals, said identification signals which exceed a predetermined threshold signal strength and for determining a received signal strength for each of said received identification signals;

storing means, provided in said mobile terminal, for storing said received signal strengths for each of said received identification signals and a type of base station that transmitted each of said identification signals, said type being one of said large service area base station and said small service area base station;

speed determination means, provided in said mobile terminal, for determining whether a moving speed of said mobile terminal exceeds a predetermined speed; and selecting means, provided in said mobile terminal, for selecting a most effective base station for providing a communication link therewith based on said received identification signals, wherein said most effective base station corresponds to said large service area base station when said moving speed of said mobile terminal exceeds said predetermined speed and one of said received identification signals corresponds to said large service area base station, wherein said most effective base station corresponds to one of said small service area base stations when said moving speed of said mobile terminal does not exceed said predetermined speed and one of said received identification signals corresponds to one of said small service area base stations, and wherein if none of said received identification signals correspond to said large service area base station and said moving speed of said mobile terminal exceeds said predetermined speed, one of said small service area base stations corresponding to one of said received identification signals is selected as said most effective base station.

2. A mobile communication system according to claim 1, wherein, when none of said received identification signals correspond to said large service area base station and said moving speed of said mobile terminal exceeds said predetermined speed, a small service area base station corresponding to an identification signal having a greatest received signal strength is selected as said most effective base station.

3. A mobile communication method carried out by a mobile terminal in a mobile communication system which includes a large zone being served by a large service area base station, said large zone being divided into a plurality of small zones each being respectively served by a small service area base station, said mobile terminal having a capability of identifying said large service area base station and each of said small service area base stations by receiving a respective identification signal sent from said large service area base station and said each of said small service area base stations, said method comprising the steps of:

receiving one or more of said respective identification signals that exceed a threshold signal strength as received identification signals;

storing a type of base station that sent each of said received identification signals, and a signal strength of said each of said received identification signals;

measuring a moving speed of said mobile terminal;

selecting said large service area base station as a most effective base station for communication therewith when either: i) said moving speed exceeds a first speed level and one of said received identification signals corresponds to said large service area base station, or ii) said moving speed does not exceed said first speed level and none of said received identification signals correspond to any of said plurality of small service area base stations;

selecting one of said small service area base stations as said most effective base station for communication therewith when either: i) said moving speed does not exceed said first speed level and one of said received identification signals corresponds to one of said small service area base stations, or ii) said moving speed exceeds said first speed level, one of said received identification signals corresponds to one of said small service area base stations, and none of said received identification signals correspond to said large service area base station; and commencing communication with said most effective base station.

4. A mobile communication method carried out by a mobile terminal in a mobile communication system which includes a large zone being served by a large service area base station, said large zone being divided into a plurality of small zones each being respectively served by a small service area base station, said mobile terminal having a capability of identifying said large service area base station and each of said small service area base stations by receiving a respective identification signal sent from said large service area base station and said each of said small service area base stations, said mobile terminal communicating with one of said plurality of small service area base stations and said large service area base station by a radio channel, said method comprising the steps of:

measuring a signal level of said radio channel being used for communication with said one of said plurality of small service area base stations and said large service area base stations;

transferring a base station changeover request to said one base station when the measured signal level is less than a first signal level, said base station changeover request being made by the following steps:

receiving respective identification signals being sent from base stations other than said one base station;

storing a type of base station of each of said received identification signals, said type being one of said small service area base stations and said large service area base station;

measuring a moving speed of said mobile terminal;

selecting said large service area base station as a most effective base station for communication therewith when either: i) said moving speed exceeds a first speed level and one of said received identification signals corresponds to said large service area base station, or ii) said moving speed does not exceed said first speed level and none of said received identification signals correspond to any of said plurality of small service area base stations;

selecting one of said small service area base stations as said most effective base station for communication therewith when either: i) said moving speed does not exceed said first speed level and one of said received identification signals corresponds to one of said small service area base stations, or ii) said moving speed exceeds said first speed level, one of said received identification signals corresponds to one of said small service area base stations, and none of said received identification signals correspond to said large service area base station; and commencing communication with said most effective base station.

5. A mobile communication method according to claim 4, wherein the selection of one of said small service area base stations as said most effective base station when said moving speed does not exceed said first speed level is based on signal strengths such that a small service area base station having a greatest signal strength among said received identification signals is selected as said most effective base station.

6. A mobile communication method according to claim 4, wherein the selection of one of said small service area base stations as said most effective base station when said moving speed does exceed said first speed level is based on signal strengths such that a small service area base station having a greatest signal strength among said received identification signals is selected as said most effective base station.

* * * * *